(12) United States Patent
Paulsen

(10) Patent No.: US 7,745,052 B2
(45) Date of Patent: Jun. 29, 2010

(54) PASTE ELECTROLYTE AND RECHARGEABLE LITHIUM BATTERY CONTAINING THE SAME

(75) Inventor: Jens M. Paulsen, Daejeon (KR)

(73) Assignee: LG Chem, Ltd. (KR)

(*) Notice: Subject to any disclaimer, the term of this patent is extended or adjusted under 35 U.S.C. 154(b) by 260 days.

(21) Appl. No.: 11/343,166

(22) Filed: Jan. 30, 2006

(65) Prior Publication Data

US 2006/0194117 A1 Aug. 31, 2006

Related U.S. Application Data

(60) Provisional application No. 60/648,263, filed on Jan. 28, 2005.

(51) Int. Cl.
*H01M 6/18* (2006.01)
(52) U.S. Cl. .................. 429/304; 429/300; 429/307; 429/329; 429/332
(58) Field of Classification Search ................ 429/304, 429/300, 307, 329, 332
See application file for complete search history.

(56) References Cited

U.S. PATENT DOCUMENTS

| 6,544,689 | B1 | 4/2003 | Riley et al. ............... 429/302 |
| 6,821,677 | B2 * | 11/2004 | Inagaki et al. ............ 429/221 |
| 2004/0126667 | A1 | 7/2004 | Sandi-Tapia et al. ....... 429/317 |

FOREIGN PATENT DOCUMENTS

| JP | 9-115505 | 5/1997 |
| JP | 10-12269 | 1/1998 |

OTHER PUBLICATIONS

Zhaohui Chen's PhD thesis, Chapter 6, Dalhousie University, Halifax; 2003; pp. 88-100 w/Abstract.
"Ionic Conduction in Space Charge Regions"; Authors: Joachim Maier; Pergamon; Prog. Solid St. Chem., vol. 23; Elsevier Science Ltd.; 1995; pp. 171-172, 248-250.
Second Phase Effects on the Conductivity of Non-Aqueous Salt Solutions: "Soggy Sand Electrolytes"; Authors: Aninda J. Bhattacharyya and Joachim Maier; Advanced Materials; Communications; vol. 16, No. 9-10; Wiley-VCH Verlag GmbH & Co. KGaA, Weinheim; 2004; pp. 811-814.
"Improved Li-Battery Electrolytes by Heterogeneous Doping of Nonaqueous Li-Salt Solutions"; Authors: Aninda J. Bhattacharyya, et al.; ECS; Electrochemical and Solid-State Letters, vol. 7, No. 11; The Electrochemical Society, Inc.; 2004; pp. A432 - A434.

* cited by examiner

*Primary Examiner*—Jane Rhee
(74) *Attorney, Agent, or Firm*—Cantor Colburn LLP

(57) ABSTRACT

The present invention provides a paste electrolyte comprising an organic solvent of not high dielectric constant, soluble lithium salts, and clays, with the clays being swollen by the solvent, and rechargeable lithium batteries containing the paste electrolyte. The paste electrolyte according to the present invention can improve the electrochemical properties and cycling stability of rechargeable lithium batteries by limiting the anionic transport between anode and cathode without significantly decreasing the lithium transport rate, particularly during fast charge and discharge.

16 Claims, 1 Drawing Sheet

PASTE ELECTROLYTE AND RECHARGEABLE LITHIUM BATTERY CONTAINING THE SAME

CROSS REFERENCE TO RELATED APPLICATION

This application claims the benefit of the filing date of U.S. Provisional Application No. 60/648,263, filed Jan. 28, 2005, which is incorporated herein in its entirety.

FIELD OF THE INVENTION

The present invention relates to a paste electrolyte comprising an organic solvent of not high dielectric constant, soluble lithium salts, and clays, with the clays being swollen by the solvent, and rechargeable lithium batteries containing the paste electrolyte which separates anode and cathode to allow fast diffusion of lithium ions but hinders a fast anionic diffusion.

BACKGROUND OF THE INVENTION

Liquid electrolyte is applied in most commercial rechargeable lithium batteries. Alternatively, a so-called gel polymer, i.e. polymer with a very large fraction of liquid electrolyte is applied. These electrolytes have relatively high ionic conductivity, whereas the Li transference number thereof is typically below 0.5, i.e., $t_{Li+}$<0.5. As a result, anionic diffusion dominates during fast charge and discharge.

This low Li transference number causes dramatic and undesired effects. More specifically, during fast charge or discharge, anions counter-diffuse and a gradient of salt concentration is established in the electrolyte, whereby the electrolyte kinetically depletes. Consequently, the electrolyte conductivity decreases to cause poor rate performance. Furthermore, the electronic potential of lithium plating is altered, and particularly during fast charge in a region near to the anode, the electrolyte may exceed the electronic stability window, causing accelerated reductive electrolyte decomposition.

As a result, it is strongly desired to slow down the anionic diffusion. In an ideal case, a Li-ion conductive membrane with the Li transference number, $t_{Li+}$=1, separates the electrolyte-soaked anode and cathode; however, no practical ways that are able to achieve it have been found yet. Generally, the charge transfer of lithium at the solid electrolyte-liquid electrolyte interface of such membranes is too slow.

Numerous patents suggest composites of polymer (e.g., PEO) with inorganic fillers (e.g., nano-$Al_2O_2$ or silica) to create solid electrolytes with improved conductivity and an increased Li-transference number. However, in spite of the significant progress, the achieved transport properties are far away from real commercial requirements. It is doubtful if further progress can be achieved. The improvement in these composites is attributed to structural changes (less crystallinity) of the polymer near to the filler particle, and thus, further significant improvements are not likely.

Another approach is known in the area of solid electrolytes. Here metal-halogenite solid electrolyte ionic conductors like lithium iodite (LiI) or silver halogenides (AgCl, AgBr, AgI) tc.) are "heterogeneously doped" using submicrometer particles (e.g., $Al_2O_3$). In this approach, the transport properties can be improved because the grain boundary conduction exceeds the bulk conduction. The increase of grain boundary conductivity is explained by the concept of space charge. This concept has in detail been summarized in "Ionic conduction in space charge regions" (J. Maier, Prog. Solid State Chem, 23, 171).

A similar concept has been applied to liquid electrolytes. "Heterogeneous doping" of liquid electrolytes has been described in "Second phase effects on the conductivity of non-aqueous salt solutions: soggy sand electrolytes" (A. J. Bhattacharya and J Mair, Advanced Materials 2004, 16, 811) and "Improved Li-battery Electrolytes by heterogeneous Doping of Nonaqueous Li-salt solution" (A. J. Bhattacharya, Mockael Dolle and J Mair, Electroch. Sol. State Letters 7 (11) A432). In these cases, addition of fine particles such as $Al_2O_3$, $TiO_2$, $SiO_2$, etc. to the electrolyte results in "soggy sand electrolytes". Soggy sand means that rigid solid particles (which may have small sizes) coexist with a liquid phase. Among them, in the case of $SiO_2$, an improvement of transport properties is achieved; however, it is not recommended to apply $SiO_2$ because in real batteries it causes undesired side reactions consuming lithium, which has been investigated and described in detail in chapter 6 of Zhaohui Chen's PhD thesis (Dalhousie university, Halifax, 2003).

Therefore, there is strong need for liquid electrolyte being able to allow the fast diffusion of lithium ions but that hinders a fast anionic diffusion.

SUMMARY OF THE INVENTION

The objects of the present invention are to completely solve the problems described above.

An object of the present invention is to provide a paste electrolyte being able to improve the electrochemical properties and cycling stability of rechargeable lithium batteries by limiting the anionic transport between anode and cathode without significantly decreasing the lithium transport rate, particularly during fast charge and discharge.

Another object of the present invention is to provide a rechargeable lithium battery containing the above paste electrolyte.

In order to accomplish these objects, there is provided in the present disclosure a paste electrolyte comprising an organic solvent of not high dielectric constant, soluble lithium salts, and clays, with the clays being swollen by the solvent.

Therefore, the paste electrolyte in accordance with the present invention is a mixture of a specific organic solvent, soluble lithium salts and specific clays, in other words, a liquid composite of liquid organic electrolyte with swollen clay.

The paste electrolyte of the present invention limits the anionic transport between anode and cathode to improve the electrochemical properties of rechargeable lithium batteries, particularly fast charge/discharge properties, without significantly decreasing the lithium transport rate, and also guarantees long term chemical stability in contact with lithium salts to increase the cycling stability of rechargeable lithium batteries. On the other hand, the paste electrolyte of the present invention does not decrease the energy density of rechargeable lithium batteries and does not increase the price thereof unreasonably.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
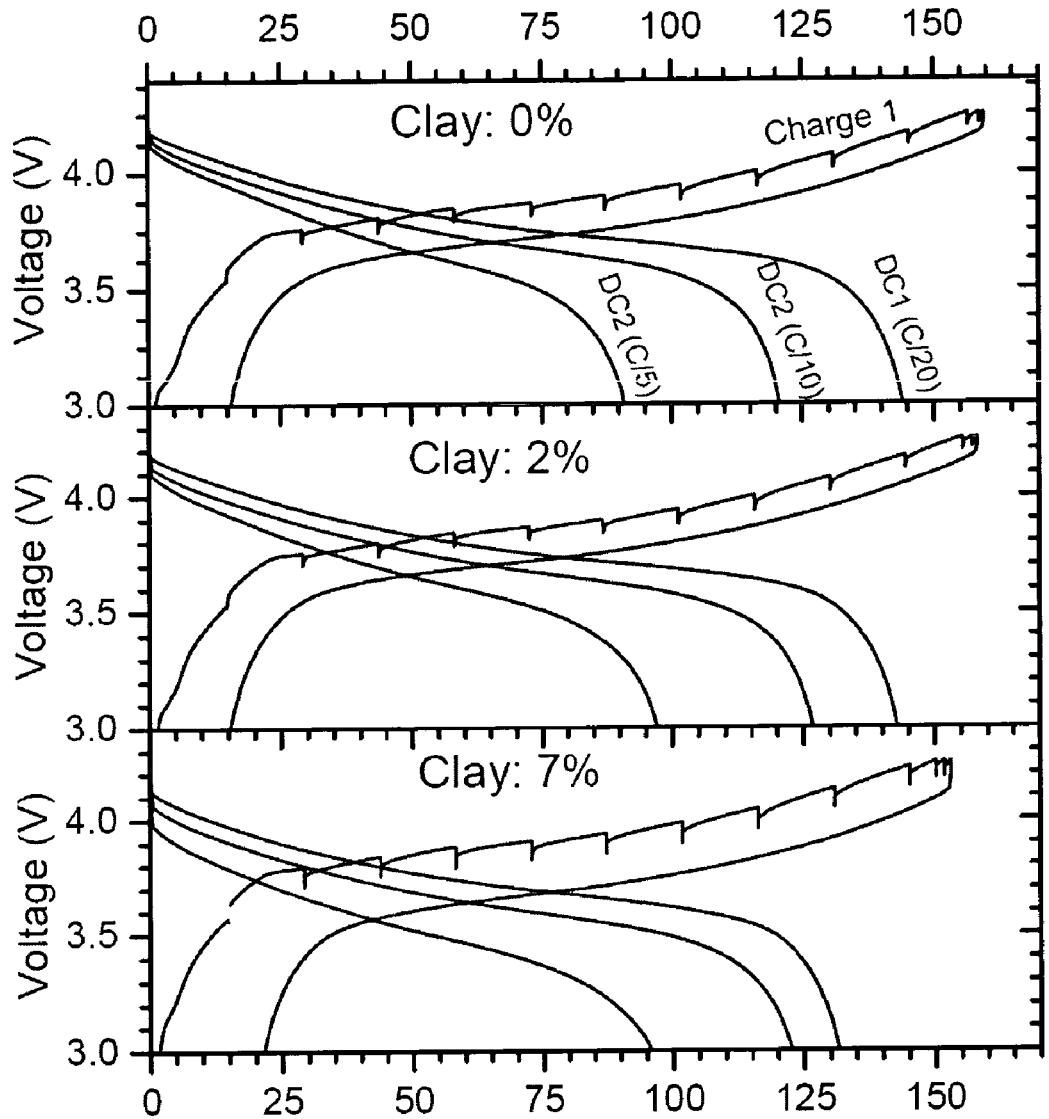
FIG. 1 is a graph showing the results of electrochemical test (cycle 1 and discharge rate performance) of the coin cells containing thick-electrode pellets in Example 5.

The organic solvent in the paste electrolyte of the present invention has a low to medium dielectric constant ($\in$), desirably, $3<\in<50$. A lower dielectric constant undesirably prevents the clay from swelling in the electrolyte. On the other hand, where the dielectric constant is larger than the preferred region, the anionic transport in the electrolyte is then not sufficiently hindered. In a preferred embodiment, the solvent contains more than 50% by volume, more preferably more than 60% by volume of one or more linear carbonates such as ethyl methyl carbonate, and less than 50% by volume, more preferably less than 40% by volume of one or more cyclic carbonates such as ethylene carbonate or cyclic esters such as gamma-BL.

The soluble lithium salts dissolved in the solvent include, for example, but are not limited to $LiPF_6$, $LiBF_4$, Li-Beti ($Li[N(SO_2CF_2CF_3)_2]$), LiBOB (lithium Bis(oxalato)borate), lithium trifluoromethanesulfonate, lithium Bis(trifluoromethanesulfonyl)imide etc. in a total concentration exceeding 0.5 mol/liter solvent. The volume fraction of the liquid electrolyte (i.e. solvent+salt) in the paste electrolyte is more than 75% but less than 99%.

The clays used in the present invention include, for example, but are not limited to hectorite, montmorillonite, alpha-zirconium phosphate, etc., and preferably they contain lithium and/or sodium. The clays may be used in any combination of two or more. The content of clays in the paste electrolyte is in the range of 1~25% by weight based upon the total weight of the paste electrolyte. In the paste electrolyte, the clays are exfoliated by the organic solvent. The general size of exfoliated clay sheets does not exceed 2 micrometers, more preferably is significantly less than 0.5 micrometers.

Generally, different clays have different properties. Usually they easily swell in water, but the swelling is more difficult to occur in organic solvent. According to the present invention, clays with high swelling ability are more preferable. One example for the clays with very good swelling properties is synthetic phyllosilicate containing sodium. In some cases, sodium is undesired; therefore, in the prior art, clays have been sometimes treated to ion exchange sodium for lithium. Lithium-containing clays, however, have less swelling ability. Inventors of the present invention discovered that this ion exchange is not required. The small content of sodium is beneficial to the cycling stability of lithium cells or at least does not harm it.

Some prior arts disclose use of clay in electrolyte or electrode for rechargeable lithium batteries but none of them teach or suggest the paste electrolyte in accordance with the present invention. To help the understanding to the present invention, these prior arts are illustrated in below.

US 2004/0126667A1 discloses an ion conducting nanocomposite comprising a polymer such as PEO and negatively charged synthetic clays such as Si-rich hectorite. This composite is a polymer-clay composite different from the paste electrolyte of the present invention, and as mentioned already in the above, the achieved transport property is far away from real commercial requirements and also it is unlikely to expect a further improvement.

JP 96-181324 discloses a solid electrolyte being a lithium conductive clay such as montmorillonite containing a water soluble lithium salt such as $Li_2SO_4$, which is also different from the paste electrolyte of the present invention, likewise in comparison with US 2004/0126667A1 as above.

U.S. Pat. No. 6,544,689 B1 discloses a composite electrolyte consisting of a dielectric solution with high dielectric constant (50~85) and a clay filler such as Li-hectorite, dispersed into it. Since this patent applies the Li-hectorite/solution composite as a solid Li-ion conductor, the preferable dielectric solution is free of dissolved lithium salts. On the other hand, the paste electrolyte of the present invention does not comprise dielectric solutions free of dissolved lithium salts and also does not intended to facilitate a solid Li-ion conductor. It should be noted that the present invention focuses on an enhancement of the transport properties in the liquid phase. Desired interactions between the salt ions and the clay surface occur within a small region called "space charge region". A desired interaction is, for example, an interaction between an acidic clay surface and the salt anion, which enhances the lithium transport number and lithium ionic conductivity. In the case of high dielectric solvents, the space charge region is small and thus an excessive volume fraction of clay is required. The paste electrolyte of the present invention comprises a solvent with low to medium dielectric constant, exceeding those of pure linear carbonates (in the case of ethyl-methyl-carbonate (EMC), $\in\approx3$) but being significantly less ($\in<50$) than those of pure cyclic carbonates (in the case of ethylene carbonate (PC), $\in\approx65$).

JP H09-115505 discloses electrodes comprising a lithium transition metal in which powderous particles are coated with sintered clay. This technique is absolutely different from the present invention in view of kinds of application and materials.

The present invention also provides a rechargeable lithium battery containing the paste electrolyte as defined above between anode and cathode.

The paste electrolyte may be in a form of layer. A layer of the paste electrolyte (hereinafter, sometimes referred to as "paste electrolyte layer") can be located in any inner place of lithium battery so long as the paste electrolyte layer can separate anode and cathode to limit the anionic transport between the anode and cathode without significantly decreasing the lithium transport rate. Such separation may be achieved by one or more of the following:

(a) the paste electrolyte is embedded in the pores of the cathode;

(b) the paste electrolyte is applied as a thin layer between the cathode and separator, eventually penetrating the separator;

(c) the paste electrolyte is embedded in the pores of separator;

(d) the paste electrolyte is applied as a thin layer between the anode and separator, eventually penetrating the separator; and (e) the paste electrolyte is embedded in the pores of the anode.

The layers of clay can be achieved by many different methods. In principle, it is possible to deposit (for example, by coating) a layer of paste-type electrolyte-swollen clay during an assembly of a battery cell. This method, however, is not easy to implement at the production level.

In an embodiment according to the present invention, it is possible to deposit a layer of clay, swollen by a suitable solvent such as water, ethanol, NMP and the like, followed by drying. This method is especially suitable to coat a layer of clay onto the separators or onto electrodes. After assembly of a battery, electrolyte is injected and the dried layer slowly swells with electrolyte and forms the desired paste electrolyte layer.

Another preferred method is to add the clay swollen by a suitable solvent to an electrode slurry before coating of the electrode slurry into electrodes. As an example, clay swollen by NMP can be added to the NMP+PVDF-based electrode slurry containing the electrochemical active cathode or anode material. Alternatively, the clay swollen by water can be added to a water-based slurry. After coating and drying, the clay is located within the pores of the electrode, and after battery assembly and electrolyte injection, this clay is swollen by the electrolyte.

The swelling of clay by a solvent such as water, ethanol and NMP may be supported by mechanical activation including, for example, but is not limited to ballmilling, beadmilling or kneading a mixture of clay and solvent.

The other constitutional elements for rechargeable lithium batteries and the processes for preparation thereof are well known in the art to which the present invention pertains, thus the detailed description about them is omitted in the present disclosure.

EXAMPLES

Now, the present invention will be described in more detail with reference to the following examples. These examples are provided only for the purpose of illustrating the present invention and should not be construed as limiting the scope and spirit of the present invention.

Example 1

Swelling of Clay in Electrolyte

A commercial synthetic clay ("optigel SH", SuedChemie, Germany) was used. The clay was in the form of a coarse, free flowing powder. The clay was dried at 180° C. to lower the water content. 10 g of the dried clay was added to 20 g of electrolyte (1M $LiPF_6$ in EC/EMC (1:2)). After several weeks of storage at room temperature in a sealed PP vial in a glovebox, a homogeneous white paste was achieved. No mechanical force like grinding, agitating etc. was applied. This experiment demonstrates that the used clay swells in an electrolyte with medium dielectric constant.

Example 2

Swelling of Clay in NMP

A mixture of 86% NMP and 14% (w/w) clay was ballmilled using a planetary mill. A semi-transparent, homogeneous white paste was achieved.

Example 3

Addition of Clay Paste to Electrode Slurries

The clay-NMP paste of Example 2 was added to an NMP-based anode (MCMB) and an NMP-based cathode (Li-manganese-spinel) slurry, respectively, followed by homogenizing. The total content of clay per active materials in the slurry was 1% (w/w). The compositions (active material:PVDF: carbon black) of the cathode and anode slurry were 94:3:3 and 94.5:4.5:1, respectively.

The slurries were coated on aluminum foil and copper foil, respectively, and then dried. An improved adhesion was observed, compared with electrodes coated from the slurry without clay.

Example 4

Storage Properties of Clay Containing Ion Cells

Coin-full cells were prepared using the electrodes of Example 3. The total 4 types of cells were prepared as the following:
(i) anode with clay—cathode with clay
(ii) anode with clay—cathode without clay
(iii) anode without clay-cathode with clay
(iv) anode without clay—cathode without clay Storage properties of charged cells (65° C.) and cycling stability (50° C.) were investigated. Cells containing clay in the anode showed clearly improved storage properties.

2 cells of each type were tested. First cells were tested for the purpose of measuring rate performance & capacity. The rate performance was similar for all cells. Then cells were charged to 4.2 V and stored for 3 days at 65° C. After storage, cells were cycled at room temperature for 2 cycles (3.0-4.2 V) starting with discharge to 3.0 V. While the first discharge capacity is the remaining capacity, the $2^{nd}$ discharge capacity is the reversible capacity. After this test, another storage was performed at 65° C. for 10 days. The results for the cell showing two with better results are summarized in TABLE 1 below.

TABLE 1

| | Before storage Cathode capacity | After storage 1 fully charged for 3 d @ 65° C. | | After storage 2 fully charged for 10 d @ 65° C. | |
|---|---|---|---|---|---|
| | (mAh/g) | remaining | reversible | remaining | reversible |
| Anode & cathode with clay | 91.6 (100%) | 70.0 76.4% | 77.0 84.0% | 49.2 53.7% | 56.7 61.9% |
| Anode clay Cathode no clay | 93.0 (100%) | 72.8 78.2% | 78.1 83.9% | 49.4 53.1% | 56.6 60.8% |
| Anode no clay Cathode clay | 90.0 (100%) | 63.1 70.1% | 69.5 77.2% | 22.2 24.6% | 31.03 34.5% |
| Anode & cathode without clay | 90.8 (100%) | 66.6 73.4% | 72.1 79.4% | 40.2 44.2% | 47.0 51.8% |

The above result shows that the addition of clay has a positive effect on the storage properties (remaining and reversible capacity) of Li-batteries.

Example 5

Change of Electrolyte Properties

It is difficult to exactly measure transport properties of electrolyte, i.e., conduction and transference number. Therefore, in this experiment, the ionic transport of electrolyte was indirectly measured by comparing the rate performance of cells with clay with those of cells without clay. In this connection, it is important to achieve a similar cell geometry such as thickness of electrodes, porosity, loading, etc., and it is also important that the electrolyte transport is the only rate-limiting step. To achieve those requirements coin cells with pellet type electrodes were prepared.

The active anode material was MCMB and the active cathode material was $LiCoO_2$. The cathode mass was 239~240.2 mg. The composition (LiCoO$_2$:PVDF:Carbon Black:Clay) was 85:7:8 for cathodes without clay and 85:6.07:6.93:2 and 85:4:4:7 for cathodes with clay, respectively. The thickness of pellets was 0.48~0.51 mm and the diameter was 15 mm. The anode pellets were free of clay and had a composition (MCMB:PVDF:Carbon Black) of 90:7:3. The anode mass was 149.9~150.4 mg. The thickness of the pellets was 0.49~0.52 mm. The diameter was 16 mm. Electrode pellets were prepared by drying an NMP-PVDF-based slurry, followed by grinding and controlled pressing of pellets. Clay-containing slurries were prepared by adding the clay-NMP paste of Example 2.

Coin cells were assembled. After very slow formation (C/100, 1C=150 mA/g cathode) for 10 h, the cells were charged to 4.25 V. The charging occurred by 15 repeated sequences of C/20 charge for 2 h (or until 4.25 V cutoff was reached) and rest for 2 h. All electrochemical testing was performed at 25° C.

Discharge was at C/20, C/10 and C/5 rate. The results of the best 3 cells out of 9 prepared cells are expressed in FIG. 1. First, it is important to note that cells with a total thickness of 1 mm are only limited by the electrolyte transport. All other processes such as electronic conduction solid diffusion within single particles and the like are orders of magnitude slower. The cell with 7% clay clearly shows the largest electrolyte resistance, which can be seen by the gap between $1^{st}$ charge and $1^{st}$ discharge curve, as well as by the larger relaxation during the rest periods during the charge. We also see the larger electrolyte resistance of the 7% clay cell during discharge. The gap between C/20 and C/5 discharge curve is clearly larger for 7% clay compared with 0 or 2% clay. Additionally the discharge capacity at a slow rate is less, and the reason for this is not clear. However, despite the larger electrolyte resistance and the lower capacity, the 7% clay cell shows a good C/5 discharge capacity. This result strongly illustrates that the Li transference number of the electrolyte in the 7% clay cell increases. As a result, there is less electrolyte depletion, and the discharge profile bends more slowly down. The results are summarized in TABLE 2 below.

TABLE 2

|  | Discharge capacity (C/20) mAh/g | Discharge capacity (C/10) mAh/g | Discharge capacity (C/5) mAh/g |
|---|---|---|---|
| Clay: 0% | 144 (100%) | 120 (83%) | 91 (63%) |
| Clay 2% | 143 (100%) | 127 (89%) | 97 (68%) |
| Clay 7% | 131 (100%) | 122 (93%) | 96 (73%) |

As can be seen in TABLE 2, the discharge capacities associated with the discharge at C/20 clearly increase with the increasing content of clay.

INDUSTRIAL APPLICABILITY

As apparent from the foregoing, the paste electrolyte according to the present invention can improve the electrochemical properties and cycling stability of rechargeable lithium batteries by limiting the anionic transport between anode and cathode without significantly decreasing the lithium transport rate, particularly during fast charge and discharge.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rechargeable lithium battery comprising:
   an anode, the anode comprising an active anode material wherein the active anode material is a carbonaceous material;
   a cathode; and
   a paste electrolyte between the anode and cathode, wherein the paste electrolyte comprises:
   an organic solvent having a dielectric constant ($\in$) greater than 3 and less than 50;
   a soluble lithium salt; and
   a clay, wherein the clay is swollen and exfoliated by the solvent to form an exfoliated clay sheet.

2. The rechargeable lithium battery according to claim 1, wherein said organic solvent contains more than 50% by volume of at least one linear carbonate and less than 50% by volume of a cyclic compound comprising at least one of a cyclic carbonate and a cyclic ester.

3. The rechargeable lithium battery according to claim 2, wherein said organic solvent contains more than 60% by volume of at least one linear carbonate and less than 40% by volume of a cyclic compound comprising at least one of a cyclic carbonate and a cyclic ester.

4. The rechargeable lithium battery according to claim 1, wherein said soluble lithium salt is selected from the group consisting of LiPF$_6$, LiBF$_4$, Li-Beti, LiBOB, LiTFSI, and combinations thereof.

5. The rechargeable lithium battery according to claim 1, wherein said soluble lithium salt is contained in a concentration exceeding 0.5 mol/liter of the organic solvent.

6. The rechargeable lithium battery according to claim 1, wherein said clay is selected from the group consisting of hectorite, montmorillonite and alpha-zirconium phosphate.

7. The rechargeable lithium battery according to claim 1, wherein said clay contains lithium or sodium.

8. The rechargeable lithium battery according to claim 7, wherein said clay is a phyllosilicate containing sodium.

9. The rechargeable lithium battery according to claim 1, wherein the volume fraction of the liquid electrolyte (solvent+salt) in said paste electrolyte is more than 75% but less than 99%.

10. The rechargeable lithium battery according to claim 1, wherein the size of said exfoliated clay sheet does not exceed 2 micrometers.

11. The rechargeable lithium battery according to claim 10, wherein the size of said exfoliated clay sheet is less than 0.5 micrometers.

12. The rechargeable lithium battery according to claim 1, wherein said paste electrolyte separates the anode and the cathode and wherein the paste electrolyte is disposed by a method selected from the group consisting of:
   (a) embedding the paste electrolyte in the pores of the cathode;
   (b) applying the paste electrolyte as a thin layer between the cathode and a separator, eventually penetrating the separator;
   (c) embedding the paste electrolyte in the pores of the separator;
   (d) applying the paste electrolyte as a thin layer between the anode and the separator, eventually penetrating the separator; and
   (e) embedding the paste electrolyte in the pores of the anode.

13. The rechargeable lithium battery according to claim 1, wherein a layer of said paste electrolyte is prepared by coating a layer of the clay swollen with a solvent onto an electrode surface or a separator surface, followed by drying, and a final swelling of the clay with an electrolyte is achieved after the assembly of a cell and injection of the electrolyte into the cell.

14. The rechargeable lithium battery according to claim 13, wherein said solvent is water, ethanol, NMP, or combination thereof.

15. The rechargeable lithium battery according claim 13, wherein said clay is embedded into the pores of the anode or the cathode by adding the clay swollen by said solvent to an electrode slurry before coating.

16. The rechargeable lithium battery according claim 15, wherein said clay is swollen by NMP, and the swelling is supported by a method of mechanical activation, the method including ballmilling, beadmilling or kneading a mixture of the clay and NMP.

* * * * *